United States Patent [19]

Tolson

[11] Patent Number: 5,537,804
[45] Date of Patent: Jul. 23, 1996

[54] FILM SEALING APPARATUS AND METHOD

[75] Inventor: Sidney S. Tolson, Scotland Neck, N.C.

[73] Assignee: Ossid Corporation, Rocky Mount, N.C.

[21] Appl. No.: 526,435

[22] Filed: Sep. 11, 1995

[51] Int. Cl.$^6$ ........................................ B65B 7/02
[52] U.S. Cl. ........................ 53/479; 53/450; 53/550; 53/374.8
[58] Field of Search .......................... 493/207, 209, 493/341; 156/515; 53/450, 451, 550, 551, 552, 553, 479, 374.8, 371.8

[56] References Cited

U.S. PATENT DOCUMENTS

| | | | |
|---|---|---|---|
| 3,473,288 | 10/1969 | Nakamura et al. | 53/550 |
| 3,628,306 | 12/1971 | Jacobson | 53/553 |
| 4,073,116 | 4/1978 | Glover | 53/550 |
| 4,974,824 | 12/1990 | Kinkel et al. | 53/553 |
| 5,463,851 | 11/1995 | Nagai | 53/552 |

*Primary Examiner*—John Sipos
*Assistant Examiner*—Gene L. Kim
*Attorney, Agent, or Firm*—Olive & Olive

[57] ABSTRACT

A method of apparatus for heat sealing two portions of film associated with packaging of a product is based on bringing the two portions of film being joined together under pressure of mating sealing components, heating the juncture between the portions and during the time such pressure and heat is being applied, forcing one of the sealing components engaging the film to shift relative to the other of the sealing components in the direction of the seal whereby to improve the quality of the seal.

14 Claims, 2 Drawing Sheets

FILM SEALING APPARATUS AND METHOD

FIELD OF THE INVENTION

This invention relates to apparatus and methods for sealing film used to wrap products. The invention more specifically relates to the construction of sealing bars and to methods for the heat-sealing of film as used in the practice of packaging products such as poultry and the like.

BACKGROUND OF THE INVENTION

U.S. Pat. Nos. 4,907,399, and 5,329,745, the teachings of which are incorporated by reference, illustrate typical packaging machines in which the packages produced consist of trays filled with poultry or other products which are wrapped with a polymeric film capable of being heat sealed. A particular film capable of being heat sealed is referred to as a shrink-wrap film. In a typical method of wrapping packages of this kind, each tray with its products is enclosed in a tube formed of film whose longitudinal edges are first sealed to each other parallel to the axis of the tube so as to produce what is called a longitudinal seal. In a succeeding stage of wrapping, the film tube is both sealed and parted along a selected line at the leading and trailing end of the tray to produce what are called the transverse end seals. U.S. Pat. Nos. 5,063,327 and 5,421,139 illustrate such longitudinal and end seals, the teachings of which are also incorporated by reference.

Longitudinal seals are typically formed by feeding the longitudinal opposed edges of the film between a pair of heated rollers as illustrated in U.S. Pat. No. 5,329,745. In this regard, it has been observed that when longitudinal seals are formed in this manner with film and particularly with shrink-wrap film, the longitudinal seals are generally found to be reliable. It has also been observed that when longitudinal seals are formed by pressing the edges of film between heated rollers, a different kind of sealing action takes place than when end seals are formed by engaging the surfaces of two sealing bars as taught in U.S. Pat. No. 5,3292,745. The end seals produced are typically not as reliable as the longitudinal seals. This difference in seal strength is particularly true in the case of shrink-wrap film when the end seals are formed by means of conventional sealing bars.

While not thoroughly understood, it is believed that the relatively poor quality of end seals is due to the fact each end seal incorporates an end of a previously formed longitudinal seal. The invention recognizes that a factor contributing to the relatively poor quality of end seals may reside in the differences in physical contact which occurs when pulling edges of film through heated rollers as compared to pressing the film between two heated bars.

Thus, the object of the invention becomes that of providing an improved apparatus and method for forming seals with film and particularly with regard to forming end seals with shrink-wrap film. Other objects will become apparent as the description proceeds.

SUMMARY OF THE INVENTION

The invention resides in a method and apparatus intended to provide a heat-sealing mechanism primarily for shrink film but applicable to any type of heat-sealable film in which two surfaces come into engagement along a selected line under pressure and in the presence of heat. During at least a major portion of the sealing process one sealing bar is made to move relative to the other sealing bar in a direction parallel to the line along which the seal is formed and under appropriate compression according to the material being sealed. The relative movement is caused to occur from the time of first contact until at least the time at which the seal is completed and the film is severed between succeeding packages.

DESCRIPTION OF PREFERRED EMBODIMENT

Figure 1:
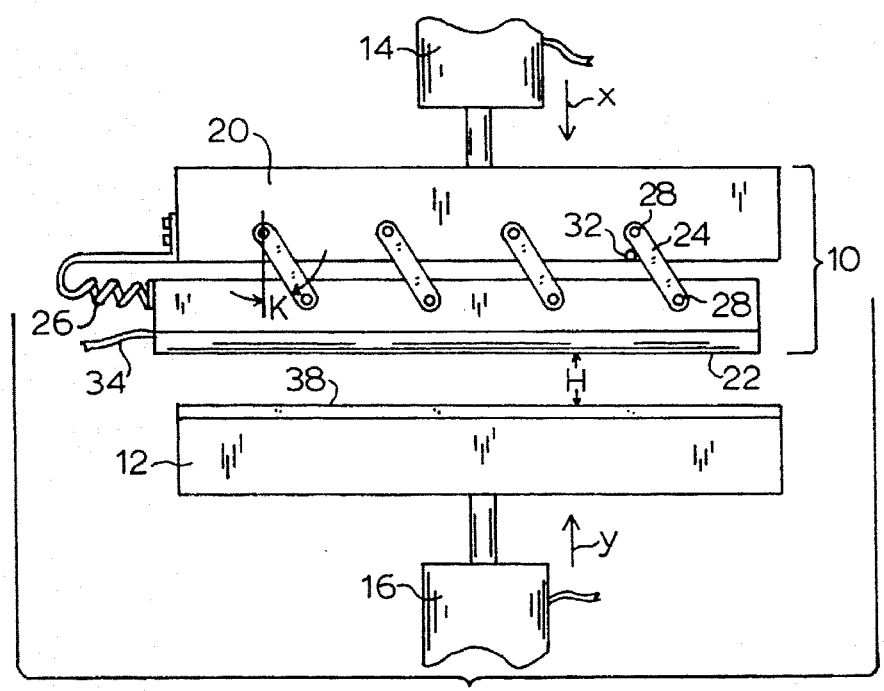
FIG. 1 is a schematic side view of a set of disengaged sealing bars according to the invention.

FIG. 1 illustrates a modified sealing mechanism according to the invention, having an upper sealing bar assembly 10, a lower sealing bar 12, an upper cylinder 14 for applying downward force (as per arrow x) to upper sealing bar 10 and a lower cylinder 16 for applying upward force (as per arrow y) to lower sealing bar 12. Upper sealing bar 10 comprises a support bar 20, a sealing bar 22, a set of connecting links 24 and a helical spring 26. Spring 26 is mounted so as to assert a longitudinal tension to sealing bar 22 with respect to support bar 20.

As illustrated in FIG. 1, sealing bar 22 resides in its resting position, below and somewhat to the left of support bar 20, by means of connecting links 24, pivotally connected to respective sealing bar 22 and support bar 24 with pins 28, or the like. Connecting links 24 are held under tension of spring 26 at a slight angle K to the vertical. At stop, such as pin 32 is secured adjacent one or more of links 24 to define the link position at angle K. When sealing bar 22 is caused to be raised toward support bar 20, connecting links 24 cause sealing bar 22 to shift simultaneously to the right, as shown. While illustrated in the preferred embodiment employing connecting links, the principles of the invention may also be practiced with other mechanisms, such as, for example, cams.

Figure 2:
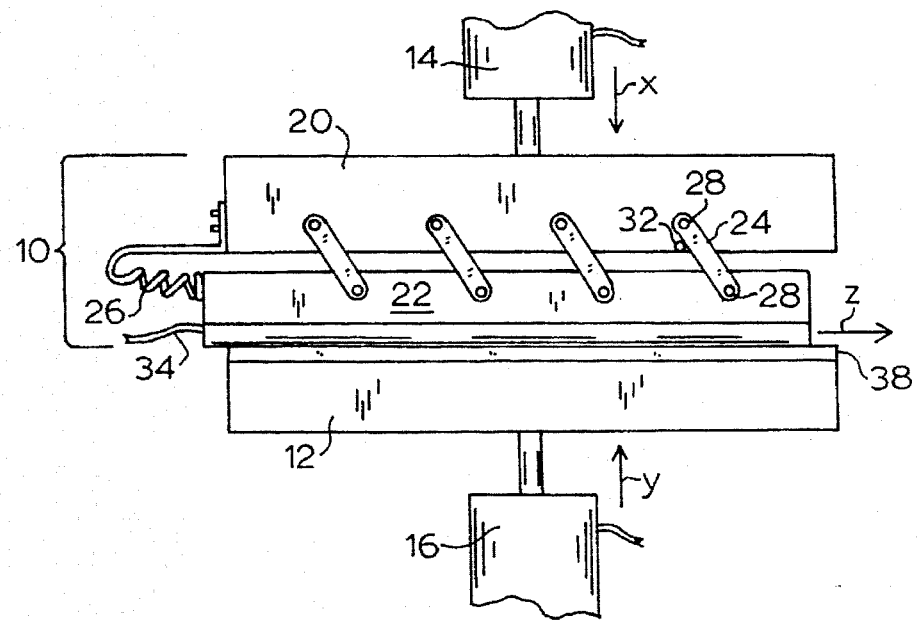
FIG. 2 is a side view of the sealing bars of FIG. 1 when engagement has just occurred.

In operation, sealing bar assembly 10 and lower sealing bar 12 are kept separated by a selected height H during a time in the packaging cycle when a package P (see FIG. 4) is moved from an upstream to a downstream position relative to the sealing station (see arrow Z). Height H is set to be sufficient to allow a package P to pass freely between sealing bar assembly 10 and lower sealing bar 12 to position sequential portions of film F for sealing (see FIG. 4). After package P has passed between sealing bar assembly 10 and lower sealing bar 12 both upper cylinder 14 and lower cylinder 16 are simultaneously activated, bringing the sealing mechanism into contact with film F to be sealed. As seen in FIG. 2, sealing bar 20 initially contacts lower sealing bar 12 with connecting links 24 at the same angle K to the vertical as seen in FIG. 1. At this point, the upper and lower portions of film (now shown in FIGS. 1 or 2) that are to be heat sealed together along a selected line are in contact under minimal pressure. In some embodiments of the invention, the sealing mechanism disclosed herein is transported cyclically in a direction of travel parallel to arrow D in a manner that the opposed sealing bars 20, 12 are in contact with one another when travelling in the direction of arrow D and separated when travelling in an opposite direction.

Figure 3:
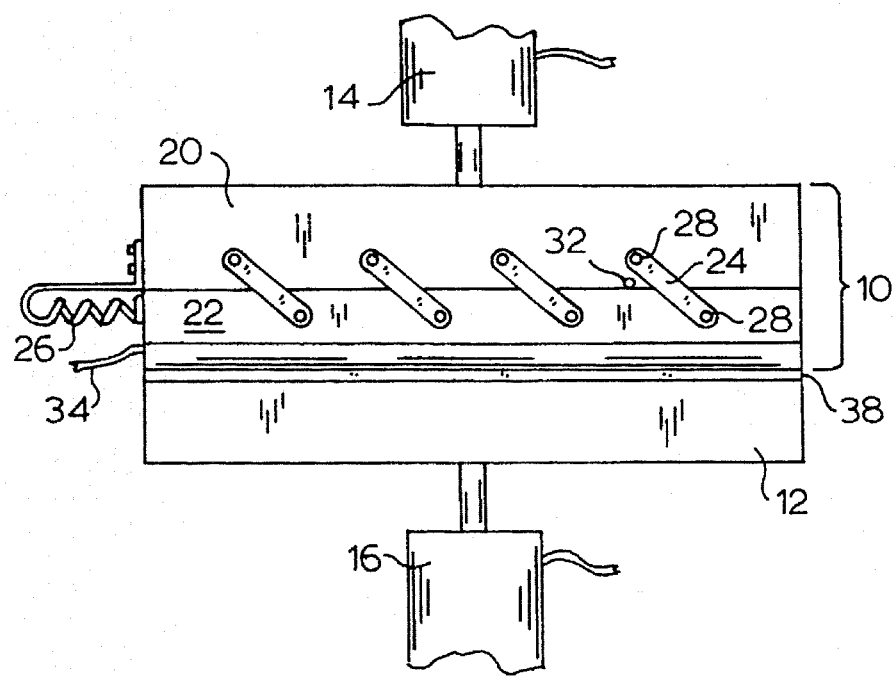
FIG. 3 is a side view of the sealing bars of FIG. 2 when engagement is full and the upper sealing bar has shifted laterally across the lower sealing bar.

Continuing with FIGS. 2 and 3, upper cylinder 14 and lower cylinder 16 continue to apply force to the respective sealing bar assembly 10 and lower sealing bar 12, causing connecting links 24 to rotate further from vertical and sealing bar 22 move to the right (as per arrow Z). When in full engagement with each other, sealing bar 22 is substantially laterally aligned with lower sealing bar 12 as illustrated in FIG. 3. A preferred embodiment of the invention results in a lateral movement of sealing bar 20 of approximately 1 cm (⅜ inch). The relative lateral movement (in the direction of arrow Z) of sealing bar 22, while pressing against lower sealing bar 12 causes a kneading action to the seam area being heated, thus improving the integrity of the resultant seam. Throughout the closure motion of the sealing apparatus described, helical spring 26 is being extended, causing a biasing of sealing bar 22. Alternate methods of biasing sealing bar 22 may satisfactorily be employed.

Upon the completion of the seal time, cylinders 14, 16 are reversed and cause upper sealing bar assembly 10 and lower sealing bar 12 to separate. Since heat is applied to the film being sealed through the sealing bars, a degree of sealing continues to occur during the reverse motion of raising sealing bar assembly 10 and lowering lower sealing bar 12. As the sealing apparatus is disengaged, spring 26 assists in returning sealing bar 20 to its position as in FIG. 1.

Figure 4:
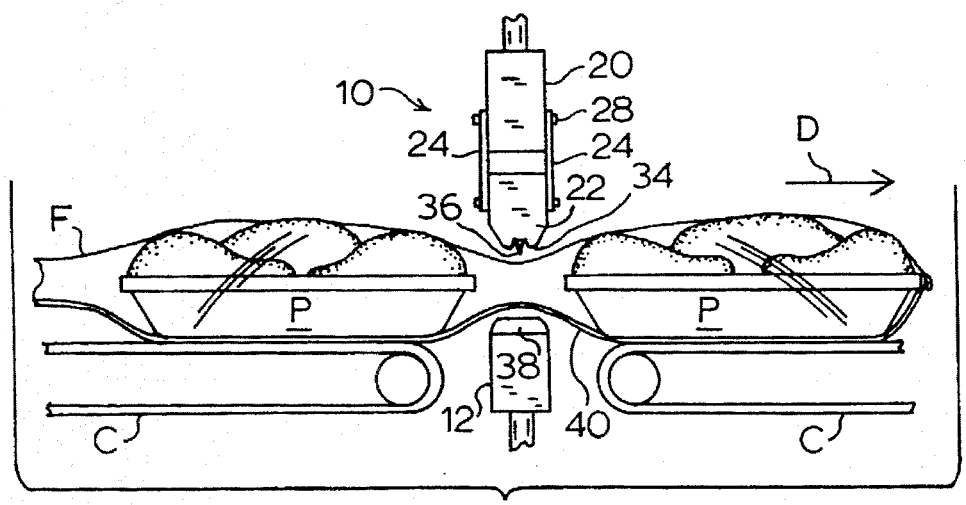
FIG. 4 is an end view of the FIG. 1 sealing bars taken in the direction of line 1—1 of FIG. 1.

As seen best in the side elevation view of FIG. 4, sealing bar assembly 10 and lower sealing bar 12 are illustrated in an intermediate position about to contact the upper and lower portions of the film tube formed of film F for sealing. Successive packages P are transported from an upstream to a downstream position (as per arrow D) by conveyors C. A parting blade 36 is positioned between a pair of film grips 34 on the lower surface of sealing bar 22. Parting blade 36 may be in the form of a bar of triangular cross section with its apex directed downward toward lower sealing bar 12. Parting blade 36 is heated electrically by power through connecting cord 34, according to the preferred embodiment, and is formed to both create a seal between the upper and lower portions of film F and to part film F between successive packages P. A resilient strip 38 is secured on the upper surface of lower sealing bar 12 to act as a cushion against which sealing blade 36 is pressed. Lower sealing bar 12 and resilient strip 38 may but typically are not heated in the preferred embodiment. With certain types of film F, a heated lower sealing bar may be beneficial. Resilient strip 38 is made of a thermally tolerant resilient material, such as, for example, silicone rubber; different density rubber material or cross sectional shape (e.g. hollow extruded shape) may be employed depending on the particular film polymer and gauge being sealed. A heat protective surface sheet, such as fiberglass reinforced teflon (not shown), may also be superimposed on resilient strip 38.

It has been found that with the lateral kneading action achieved by the apparatus of the invention, a superior seam is formed with parting blade 36 and film grips 34 at a substantially reduced temperature compared to what was previously required. In addition to a lower operating temperature, the method disclosed improves the quality of the heat-assisted parting cut between packages and appears to eliminate previously observed bubbles in the sealing area, adding to the seam integrity and appearance.

While not shown, it should be understood that the invention lends itself to rotary type sealing bars and also to the type of sealing bars in which one bar is held stationary and the other bar is moved by a pneumatic cylinder or the like. Furthermore, the present invention is useful rotated 90° from the orientation of the example shown herein, such as would be applied to sealing packages in what is known as a vertical form fill operation. Also to be understood is the fact that the sealing operation can be accomplished at one station by the method and apparatus of the invention and the parting operation at another station.

Since the preferred embodiment disclosed involves only one of a variety of the embodiments possible within the spirit and scope of the invention, such variations to achieve the objects and advantages of the invention are considered to be a part of the invention contained herein.

What is claimed is:

1. A method of sealing two opposed portions of heat-sealable film together, comprising the steps of:
   (a) bringing together facing surfaces of a pair of opposed film portions to be joined along a selected line;
   (b) heating an area which includes the selected line in at least one of the portions to be joined;
   (c) pressing said facing surfaces together along said selected line with a sealing member to form a seal coinciding with said selected line; and
   (d) during the time of said heating and pressing, moving said sealing member in a direction parallel to said selected line and along an outer surface of one of the film portions.

2. The method of claim 1 including the step of parting said film adjacent said seal.

3. An apparatus for sealing two opposed portions of heat-sealable film together along a selected line, comprising:
   (a) a first sealing device having a first surface positioned to engage an outer surface of one of said two portions of film to be sealed along said selected line;
   (b) a second sealing device having a second surface positioned to engage an outer surface of the other of said two portions of film to be sealed along said selected line;
   (c) means for heating an area which includes said selected line in one of said two portions of film to be sealed;
   (d) means for moving said first and second sealing devices so as to engage and force said portions of film together during the heating of said one of said two portions of film to form a seal along said selected line; and
   (e) means operative during the heating of said one of said film portions and moving of said sealing devices together for causing one of said sealing devices to shift in a direction parallel to said selected line.

4. An apparatus as claimed in claim 3 including means for parting said film adjacent said seal.

5. An apparatus for sealing two opposed portions of heat-sealable film together along a selected line and parting a heat-sealable film tube surrounding a series of spaced apart packages at selected positions between successive of said packages and in a direction perpendicular to the axis of said tube, said apparatus comprising:
   (a) a first sealing bar assembly oriented substantially perpendicular to said axis and mounted adjacent a sealing position;
   (b) a second sealing bar assembly mounted adjacent said sealing position and opposed and parallel to said first sealing bar assembly such that said film tube passes between said first and said second sealing bar assemblies and capable of being moved toward said sealing position a selected distance while remaining parallel with said first sealing bar assembly such that said first sealing bar assembly and said second sealing bar assembly engage one another to form a seal in said film tube;

(c) said first sealing bar assembly configured so that a film contacting portion thereof moves in a direction parallel to said selected line while applying a sealing force between opposed portion of said heat sealable film tube; and (d) means for parting said film tube at the location of said seal.

6. The apparatus of claim 5, wherein said first sealing bar is heated to a selected temperature.

7. The apparatus of claim 5, wherein said one sealing bar assembly comprises a shiftable sealing bar shiftably connected to a support bar so that said shiftable sealing bar is moved laterally relative to the motion of said first and second sealing bar assemblies when said first sealing bar assembly engages said second sealing bar assembly.

8. The apparatus of claim 5, wherein said second sealing bar comprises a resilient member for cushioning said shiftable sealing bar when engaged thereby.

9. The apparatus of claim 5, further comprising a mechanism for moving said first and second sealing bar assemblies along a path parallel to said axis of said film tube at a speed equal to the speed of said film tube in coordination with the forming of said seal.

10. A method for transversely sealing two opposed portions of heat-sealable film together along a selected line and parting a tube of heat sealable film between successive packages in a series of such packages being wrapped in said film, comprising the steps of:

(a) providing a sealing mechanism having a pair of opposed sealing bars positioned so as to transversely straddle said film tube and having a first selected portion of said sealing mechanism adapted to shift parallel to said selected line while applying a sealing force between opposed portions of said heat sealable film;

(b) heating a selected portion of at least one of said sealing bars to a selected temperature;

(c) moving portions of said opposed sealing bars including said first selected portion into engagement with each other across said film tube to form a transverse film seal;

(d) causing said first selected portion of said pair of opposed sealing bars to move parallel to said selected line with respect to another portion of said sealing bars in a direction transverse to said tube while maintaining said engagement;

(e) parting said film tube adjacent said seal; and (f) after said film tube is sealed transversely, separating said portions of opposed sealing bars.

11. The method of claim 10, further comprising the step of moving said sealing mechanism in a first direction parallel to the axis of said film tube while said portions of said opposed sealing bars are engaged and in an opposite parallel direction while said portions of opposed sealing bars are not engaged.

12. The apparatus as claimed in claim 9 wherein the axis of said film tube is oriented substantially horizontally.

13. The apparatus as claimed in claim 12 wherein said first and second sealing bar assemblies are oriented substantially perpendicular to the axis of said film tube.

14. The apparatus as claimed in claim 13 wherein said first and second sealing bar assemblies are oriented substantially horizontally.

* * * * *

UNITED STATES PATENT AND TRADEMARK OFFICE
CERTIFICATE OF CORRECTION

PATENT NO. : 5,537,804
DATED : July 23, 1996
INVENTOR(S) : Sidney S. Tolson

It is certified that error appears in the above-indentified patent and that said Letters Patent is hereby corrected as shown below:

Item [57]
Abstract, line 1, delete "of" (1st occurrence) and replace with --and--.

Column 2, line 38, correct "At" to read --A--.

Column 3, line 6, correct "further" to read --farther--.
Column 5,
Claim 5(c), line 4, correct "portion" to read --portions--.

Signed and Sealed this

Fifth Day of November, 1996

Attest:

BRUCE LEHMAN

*Attesting Officer*  *Commissioner of Patents and Trademarks*